Patented Aug. 8, 1944

2,355,337

UNITED STATES PATENT OFFICE 2,355,337

PREPARATION OF ETHER AMINES

Le Roy U. Spence, Elkins Park, Pa., assignor to Röhm & Haas Company, Philadelphia, Pa., a corporation of Delaware No Drawing. Application August 28, 1942, Serial No. 456,525

9 Claims. (Cl. 260—584)

This invention relates to an improved method for the preparation of ether amines of the formula $$[R(OC_nH_{2n})_x]_mNH_{3-m}$$

wherein R is a hydrocarbon radical, $C_nH_{2n}$ represents an alkylene group in which $n$ is an integer having a value of two to four, inclusive, $x$ is an integer having a value of one or more, and $m$ is an integer having a value of one to three, inclusive.

Amines of this type have been prepared by reaction of the monoether of a glycol or polyglycol and ammonia, but the yields by this process are relatively poor even in the presence of catalysts. Simple amines have been reacted with haloalkyl ethers, particularly to form quaternary ammonium salts. The comparable reaction of haloalkyl ethers with ammonia, as might be expected, leads to amines of the above formula, but the direct reaction also leads to the formation of quaternary ammonium salts, the yields of desired amines are not generally favorable for commercial operation, and the reacting mixture is excessively corrosive to iron or steel. Since the reaction with ammonia must necessarily be carried out under pressure, the reaction of haloalkyl ether and ammonia is fraught with difficulties which make it uneconomical.

It is now found that ether amines may be prepared in a particularly economical fashion by reacting ammonia with a compound of the formula $$R(OC_nH_{2n})_xY$$

wherein Y is a halogen and the other symbols have the same significance as above, in the presence of an aqueous alkali metal hydroxide.

When an aqueous alkali, such as sodium or potassium hydroxide, is present in an amount equivalent to or in excess of the halogen present, the reaction mixture no longer exhibits the exceedingly corrosive action which seems otherwise characteristic of the reacting mixture of haloalkyl ether and ammonia. As a result, iron or steel of common and inexpensive types may be used for reaction vessels. At the same time, the formation of quaternary ammonium salts is prevented and improved yields of the desired amines are obtained. This is contrary to what might be expected because of the known proclivity for dehydrohalogenation to give vinyl ethers. This reaction, however, was not observed in the formation of the ether amines in spite of the presence of alkali.

The haloalkyl ether, $R(OC_nH_{2n})_xY$, may be selected from a large number of compounds, wherein R is an aliphatic, cycloaliphatic, arylaliphatic, or aryl group, such as methyl, ethyl, propyl, allyl, methallyl, isobutyl, butyl, hexyl, octyl, capryl, undecenyl, dodecyl, cetyl, octadecyl, octadecenyl, cyclohexyl, methyl cyclohexyl, terpenyl, benzyl, butyl benzyl, cresyl, phenyl, naphthyl, tert.-butyl phenyl, diisobutyl phenyl, etc. These groups may contain neutral substituents.

The group represented by $C_nH_{2n}$ may be an alkylene group, such as $-CH_2CH_2-$, $$-CH_2CH_2CH_2, \text{ or } CH_2CH_2CH_2CH_2-$$

or a branched chain alkylene group, such as $$-CH_2CH(CH_3)- \text{ or } -CH_2CH(CH_3)CH_2-$$

or the like. The alkylene ether group may occur one or more times, ethers having one to four such groups being most commonly used.

Typical haloalkyl ethers include such compounds as:

$CH_3OC_2H_4Cl$
$C_{12}H_{25}OC_2H_4Br$
$C_2H_5OC_2H_4OC_2H_4Cl$
$C_4H_9OC_2H_4OC_2H_4Cl$
$C_8H_{17}OC_2H_4OC_2H_4Br$
$C_4H_9OCH_2CH(CH_3)O(CH_3)CHCH_2Cl$
$C_2H_7OCH_2CH_2CH_2OCH_2CH_2CH_2Br$
$C_5H_{11}OC_2H_4OC_2H_4OC_2H_4Cl$
$C_2H_5OC_2H_4OC_2H_4OC_2H_4Cl$
$C_6H_{11}OC_2H_4OC_2H_4Br$

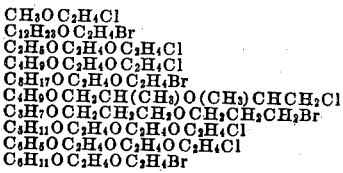

$C_6H_5CH_2OC_2H_4OC_2H_4Br$
$C_2H_5OC_2H_4OC_2H_4OC_2H_4OC_2H_4Cl$
$C_4H_9(OC_2H_4)_xBr$ where $x$ has a value of one to about 50.

The reaction is carried out between about 100° C. and about 200° C. in an autoclave which will withstand the pressures developed. The autoclave is charged with haloalkyl ether, alkali solution, and ammonia, either as liquid ammonia or as a concentrated solution. The order of addition of reactants is optional. The charge is then heated and stirred under pressure until the required extent of conversion has been attained.

While the reaction product consists of a mixture of primary, secondary, and tertiary ether amines, the proportions of these amines can be varied considerably by adjustment of the ratio of ammonia to haloalkyl ether. Thus, if a primary amine is desired, a large excess of ammonia should be used. A ratio of 5 to 15 mols of ammonia per mol of haloalkyl ether in the reaction mixture will ensure a maximum of primary amine. Excess ammonia may be separated from the reaction products and recycled.

Mixtures obtained may be purified in various ways, as by washing, drying, and fractionation, or extraction, if individual ether amines are desired. Many of the ether amines prepared according to the process here described are useful as disinfectants and insecticides. The longer chained members are useful as surface active agents which may find application in stuffing leather and finishing textiles, or find application as emulsifying agents, particularly in the form of salts.

The following examples are presented to illustrate the method of preparation of ether amines, but the process is not to be limited to the specific compounds or proportions shown therein.

Example 1

A shaking autoclave was charged with 240 parts of butoxyethoxyethyl chloride, 31 parts of anhydrous ammonia, and 110 parts of a 50% sodium hydroxide. The reaction mixture was heated to 135° C. under pressure and shaken at this temperature for six hours. The reaction mixture was then separated into an aqueous layer and an oily layer, which was washed, dried, and distilled. Some unchanged butoxyethoxyethyl chloride was recovered and some primary amine separated. There was then obtained a fraction of 64 parts of secondary amine, boiling at 180–185° C. at 5 mm., and a fraction of 105 parts of tertiary amine, boiling at 240°–250° C. at 5 mm., corresponding to yields of 35% for the secondary amine, $(C_4H_9OC_2H_4OC_2H_4)_2NH$, and of 58% for the tertiary amine,

$(C_4H_9OC_2H_4OC_2H_4)_3N$

Example 2

An autoclave was charged with 240 parts of butoxyethoxyethyl chloride, 61 parts of ammonia, and 144 parts of a 50% sodium hydroxide solution. The charge was then heated and stirred at about 150° C. for two hours. The products were recovered as above. A 15% yield of primary butoxyethoxyethylamine was obtained along with a yield of 49% of the secondary amine and 34% of the tertiary amine.

Example 3

An autoclave was charged with 209 parts of butoxyethoxyethyl chloride, 30 parts of primary butoxyethoxyethylamine, 73 parts of the corresponding secondary amine, 27 parts of ammonia, and 125 parts of a 50% sodium hydroxide solution. The reaction products were treated as above. Primary and secondary amines equal in amounts to those charged were recovered, but the yield of tertiary amine was 97% based on the butoxyethoxyethyl chloride used.

Instead of the 50% aqueous sodium hydroxide used above, there may be used other concentrations of sodium hydroxide less or greater than 50%. When aqueous ammonia is used, solid hydroxide, preferably in flake form, may be added to the reaction mixture. It is preferred that solutions of 20% to 60% be used.

I claim:
1. The process of preparing ether amines of the formula

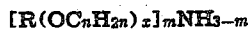
$[R(OC_nH_{2n})_x]_mNH_{3-m}$ which comprises reacting between about 100° C. and about 200° C. ammonia and a haloalkyl ether of the formula

$R(OC_nH_{2n})_xY$ in the presence of an aqueous alkali metal hydroxide in an amount at least equivalent to the haloalkyl ether, wherein in the above formulae R signifies a hydrocarbon group, $C_nH_{2n}$ represents an alkylene group in which n has a value of two to four, inclusive, x represents an integer having a value of at least one, m is an integer having a value of one to three, inclusive, and Y represents a halogen from the class consisting of chlorine and bromine.

2. The process of preparing ether amines of the formula

$[R(OC_nH_{2n})_x]_mNH_{3-m}$ which comprises reacting between about 100° C. and about 200° C. ammonia and a chloroalkyl ether of the formula

$R(OC_nH_{2n})_xCl$ in the presence of aqueous sodium hydroxide in an amount at least equivalent to the chloroalkyl ether, wherein in the above formulae R represents a hydrocarbon group, $C_nH_{2n}$ represents an alkylene group in which n has a value of two to four, inclusive, x represents an integer having a value of at least one, and m represents an integer having a value of one to three, inclusive.

3. The process of preparing ether amines of the formula

$[R(OC_nH_{2n})_x]_mNH_{3-m}$ which comprises reacting between about 100° C. and about 200° C. ammonia and a haloalkyl ether of the formula

$R(OC_nH_{2n})_xY$ in the presence of an aqueous alkali metal hydroxide in an amount at least equivalent to the haloalkyl ether, wherein in the above formulae R represents an aliphatic hydrocarbon group, $C_nH_{2n}$ represents an alkylene group in which n has a value of two to four, inclusive, x represents an integer having a value of one to four, inclusive, m represents an integer having a value of one to three, inclusive, and Y represents a halogen from the class consisting of chlorine and bromine.

4. The process of preparing ether amines of the formula

$[R(OCH_2CH_2)_x]_mNH_{3-m}$ which comprises reacting between about 100° C. and about 200° C. ammonia and a haloalkyl ether of the formula

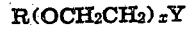
$R(OCH_2CH_2)_xY$ in the presence of an aqueous alkali metal hydroxide in an amount at least equivalent to the haloalkyl ether, wherein in the above formulae R represents a hydrocarbon group, x represents an integer from one to four, inclusive, m represents an integer from one to three, inclusive, and Y represents a halogen from the class consisting of chlorine and bromine.

5. The process of preparing ether amines of the formula

$R(OCH_2CH_2)_xNH_2$ which comprises reacting between about 100° C. and about 150° C. a haloalkyl ether of the formula

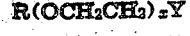
$R(OCH_2CH_2)_xY$ with an excess of ammonia in the presence of an amount of aqueous sodium hydroxide at least equivalent to the haloalkyl ether, wherein in the above formula, R represents a hydrocarbon group, $x$ represents an integer having a value of at least one, and Y represents a halogen from the class consisting of chlorine and bromine.

6. The process of preparing ether amines of the formula $$[R(OCH_2CH_2)_x]_2NH$$

which comprises reacting about 100° C. and about 200° C. a haloalkyl ether of the formula $$R(OCH_2CH_2)_xY$$

with ammonia in the presence of an amount of aqueous sodium hydroxide at least equivalent to the haloalkyl ether, wherein in the above formulae R represents a hydrocarbon group, $x$ represents an integer having a value of at least one, and Y represents a halogen from the class consisting of chlorine and bromine.

7. The process of preparing ether amines of the formula $$[R(OCH_2CH_2)_x]_3N$$

which comprises reacting between about 100° C. and about 200° C. a haloalkyl ether of the formula $$R(OCH_2CH_2)_xY$$

with ammonia in the presence of an amount of aqueous sodium hydroxide at least equivalent to the haloalkyl ether, wherein in the above formulae R represents a hydrocarbon group, $x$ represents an integer having a value of at least one, and Y represents a halogen from the class consisting of chlorine and bromine.

8. The process of preparing $$(C_4H_9OCH_2CH_2OCH_2CH_2)_2NH$$

which comprises reacting between about 100° C. and about 200° C. ammonia and $$C_4H_9OCH_2CH_2OCH_2CH_2Cl$$

in the presence of aqueous sodium hydroxide in an amount at least equivalent to said chloride and separating said amine.

9. The process of preparing $$(C_4H_9OCH_2CH_2OCH_2CH_2)_3N$$

which comprises reacting between about 100° C. and about 200° C. ammonia and $$C_4H_9OCH_2CH_2OCH_2CH_2Cl$$

in the presence of aqueous sodium hydroxide in an amount at least equal to said chloride and separating said amine.

LE ROY U. SPENCE.